United States Patent [19]
Mariani

[11] 4,198,537
[45] Apr. 15, 1980

[54] CONNECTOR
[75] Inventor: Remo Mariani, Toms River, N.J.
[73] Assignee: Thomas & Betts Corporation, Raritan, N.J.
[21] Appl. No.: 935,700
[22] Filed: Aug. 21, 1978
[51] Int. Cl.² ............................................. H02G 3/06
[52] U.S. Cl. ............................. 174/65 R; 174/51; 285/162
[58] Field of Search ............... 174/65 R, 65 G, 51, 174/78, 153 G; 285/158, 162, 189, DIG. 4; 248/56, 27.3; 339/126 R, 126 RS, 128; 200/296

[56] References Cited
U.S. PATENT DOCUMENTS

| | | | |
|---|---|---|---|
| 2,078,453 | 4/1937 | Miller | 248/56 |
| 2,687,862 | 8/1954 | Crowther | 339/126 RS |
| 3,221,572 | 12/1965 | Swick | 248/56 |
| 3,814,467 | 6/1974 | Van Buren, Jr. | 174/65 R X |
| 3,858,151 | 12/1974 | Paskert | 174/51 X |
| 3,993,333 | 11/1976 | Biswas | 285/158 X |
| 4,021,604 | 5/1977 | Dola et al. | 174/65 R X |

Primary Examiner—Bruce A. Reynolds
Assistant Examiner—D. A. Tone
Attorney, Agent, or Firm—David Teschner; James J. Daley; Jesse Woldman

[57] ABSTRACT

A connector for joining a flexible metallic raceway to an electrical enclosure comprising a nonconductive body portion having enclosure engaging means, raceway insertion limiting means and a protected conductor entrance throat and a conductive plate engageable with said body portion and said enclosure and providing raceway engaging and grounding means.

19 Claims, 10 Drawing Figures

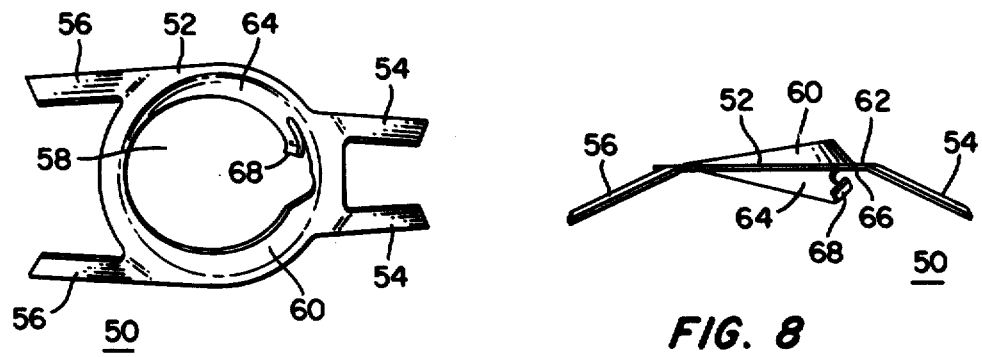
FIG. 7
FIG. 8
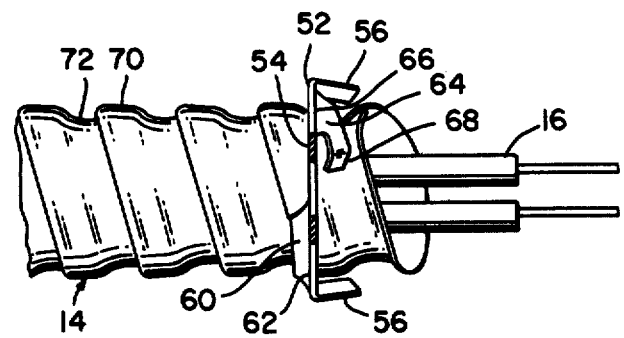
FIG. 9
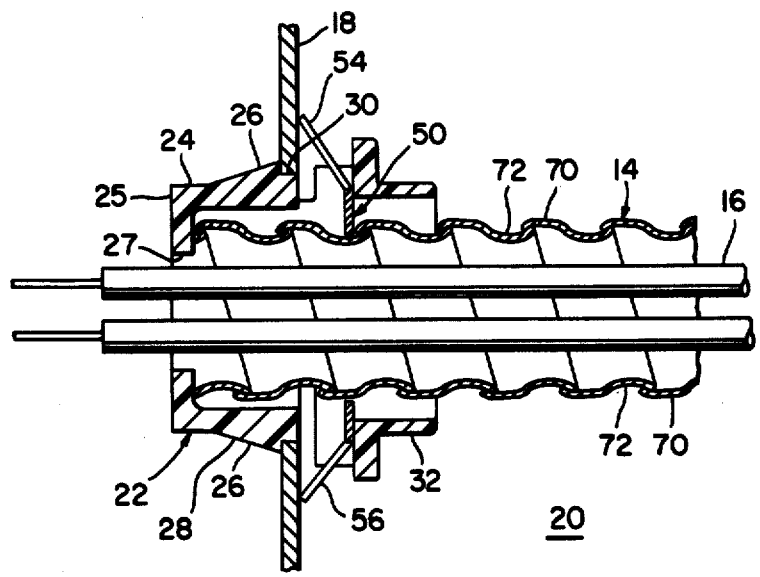
FIG. 10

CONNECTOR

BACKGROUND OF THE INVENTION

1. Field of the Invention

The present invention is directed to connectors for joining flexible metallic raceway to electrical enclosures and providing a complete ground path between such raceway and metallic electrical enclosures.

2. Description of the Prior Art

Prior art connectors of the type desired consisted of metallic body portions made of malleable iron castings or steel stampings having a threaded cylindrical end portion for insertion within the opening of a metallic electrical enclosure, and upon which a locknut was threaded to engage the wall of such enclosure between the locknut and a shoulder intermediate the connector length. A raceway insertion limit was placed at the free end of the threaded cylindrical end portion which could also receive a throat to protect conductors from the raceway entering the enclosure.

The opposite end of the connector consisted of a clamp mechanism for engaging the raceway and making a good electrical connection with it, so that a complete ground path extends between the raceway and the electrical enclosure via the connector. The clamp mechanisms employed single screw clamping sections, two screw clamping sections, or single and double tooth clamping sections. Most of such clamping mechanisms distorted the raceway, the connector, or both, making reuse of the raceway or connector impractical.

Regardless of which type of connector was used, a number of separate parts had to be produced and assembled or complex stamping, forming, and threading operations were required, making the cost of the connector substantial.

SUMMARY OF THE INVENTION

The difficulties noted above with respect to prior art devices are overcome in the present invention, which provides a simple, two piece connector for connecting a flexible metallic raceway to an electrical enclosure and providing a continuous electrical path therebetween. The insulating connector body has a first cylindrical portion having a longitudinal passage therethrough to accept the metallic raceway therein. A constriction at the free end of the passage provides a limiting stop for the metallic raceway to prevent its insertion into the enclosure as well as a protective throat for conductors entering the enclosure from the raceway to prevent damage to the conductor insulation due to any sharp edges of the cut raceway. Two deflectable tabs are formed on the first cylindrical portion to grip the interior of the enclosure wall after the first portion has been inserted through an opening in such wall. The connector body has a second, generally cylindrical portion having a longitudinal passage therethrough communicating with the passage in the first cylindrical portion. Intermediate the two cylindrical portions is a shoulder portion and slot extending transversely to and communicating with the longitudinal passage.

The second connector component is a metallic plate formed to have two pairs of arms, each pair separated from the other by 180 degrees and arranged to coact along a common axis. The plate, when inserted into the transverse slot of the body, extends beyond the first cylindrical portion of the body and engages the exterior of the enclosure wall to hold the connector in place in the opening in cooperation with the deflectable tabs of the first cylindrical portion of the body. The shoulder portion acts to back up the plate and limit the deflection of the arms to assure a good electrical and mechanical contact between these arms and the exterior of the enclosure. An aperture extends through the plate and the metal thereabout is formed into a portion of one helical turn to engage the recesses between adjacent raised convolutions as well as the opposite faces of the convolution therebetween. The helical turn terminates at one end in an inturned tooth to engage a portion of a raised convolution to retard retrogression of the raceway and prevent separation of the raceway and connector. It is an object of this invention to provide an improved connector for joining a flexible metallic raceway to an electrical enclosure.

It is another object of the invention to provide a simple, inexpensive connector for joining a flexible metallic raceway to an electrical enclosure.

It is yet another object of the invention to provide a simple, inexpensive connector comprising two parts.

It is another object of the invention to provide a connector for joining a flexible metallic raceway to an electrical enclosure comprising an insulating body and a conducting plate.

It is still another object of the invention to provide a connector having an insulating body providing a raceway insertion limit, a conductor protecting throat and means to engage the wall of an electrical enclosure and a conductive plate providing a conductive path between the raceway and the enclosure, means to grip the raceway and prevent its withdrawal and means to engage the wall of an electrical enclosure.

Other objects and features of the invention will be pointed out in the following description and claims and illustrated in the accompanying drawings, which disclose, by way of example, the principle of the invention, and the best mode which has been contemplated for carrying it out.

BRIEF DESCRIPTION OF THE DRAWINGS

In the drawings in which similar elements are given similar reference numerals:

FIG. 7 is a rear elevational view of the plate of FIG. 6.

FIG. 8 is a side elevational view of the plate of FIG. 6.

FIG. 9 is a top plan view, partly in section, of the plate of FIG. 6 installed to a flexible metallic raceway.

FIG. 10 is a side elevational view, partly in section, of the connector of FIG. 1 installed to an electrical enclosure and a flexible metallic raceway.

DESCRIPTION OF THE PREFERRED EMBODIMENTS

Figure 1:
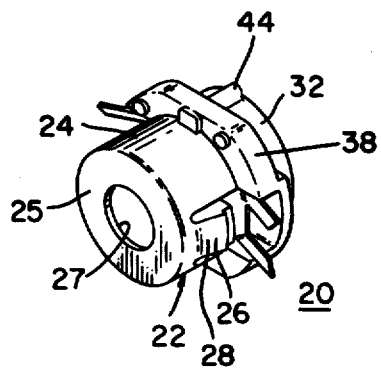
FIG. 1 is an isometric view of a connector constructed in accordance with the concepts of the invention.
Figure 2:
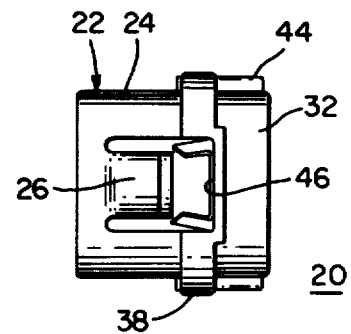
FIG. 2 is a top plan view of the connector of FIG. 1.
Figure 3:
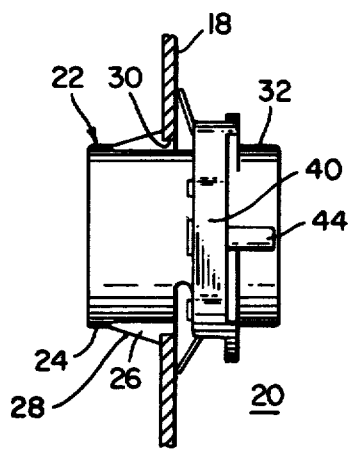
FIG. 3 is a side elevational view of the connector of FIG. 1 installed to the wall of an electrical enclosure.
Figure 4:
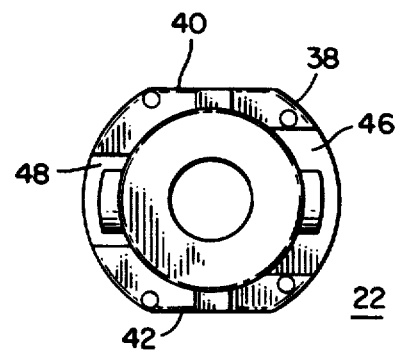
FIG. 4 is a front elevational view of the body portion of the connector of FIG. 1.
Figure 5:
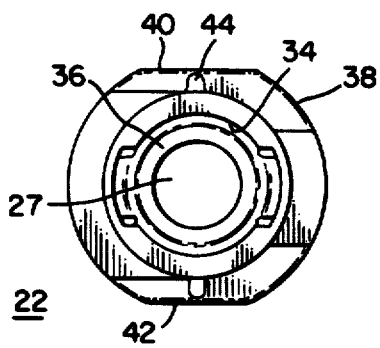
FIG. 5 is a rear elevational view of the body portion of FIG. 4.

Turning now to FIGS. 1 to 10, there is shown a connector 20 for joining a flexible metallic raceway 14 to the wall 18 of an electrical enclosure (see FIG. 10). Connector 20 is comprised of an insulating body portion 22 having a first cylindrical portion 24 proportioned to fit within the opening of a wall 18 of an electrical enclosure. Formed integrally with and extending outwardly at an oblique angle to the longitudinal axis of the body portion 22 are deflectable tabs 26. The inclined leading surfaces 28 of tabs 26 engage with the wall 18 material about the opening and are deflected inwardly permitting the first cylindrical portion 24 to pass through the opening. If an insulating body portion is not necessary or desirable, then the body portion 22 can be made from metal providing the tabs 26 having sufficient resilience to operate as desired. Once the first cylindrical portion is sufficiently inserted the tabs 26 will resiliently return to their initial position and the wall 18 will be seated, wholly or partially, upon the step 30 of tab 26 as shown in FIG. 3.

A second cylindrical portion 32 exists at the second end of body portion 22 and acts as a skirt to limit the flexure of the flexible metallic raceway 14 in the region of the connector 20. A passage 34 extends through both the first and second cylindrical portions 24 and 32, respectively. An aperture 27 in front face 25 of the first cylindrical portion 24 communicates with passage 34 and the transition provides a shoulder 36 (see FIG. 5) which acts as a stop to limit the insertion of the flexible metallic raceway 14 into connector 20 and thus prevents the raceway 14 from otherwise entering the enclosure (see FIG. 10). The conductors 16 pass through aperture 27 and are protected by the plastic edge of face 25, that defines aperture 27, from any rough edges of the cut flexible metallic raceway 14.

Intermediate the first and second cylindrical portions 24, 32 is a generally circular raised ridge 38 having flats 40, 42 to permit the gripping of the body portion 22 when the first cylindrical portion 24 of connector 20 is inserted into the wall 18 opening. Strengthening ribs 44 extend between the second cylindrical portion 32 and the ridge 38 to aid in maintaining the desired position of the ridge 38. Extending through the ridge 38 is a slot 46 restricted adjacent one end as at 48 (see FIG. 4). The restriction 48 is employed during assembly to limit the insertion of the plate into the body 22 and prevent its passing completely through slot 46.

Figure 6:
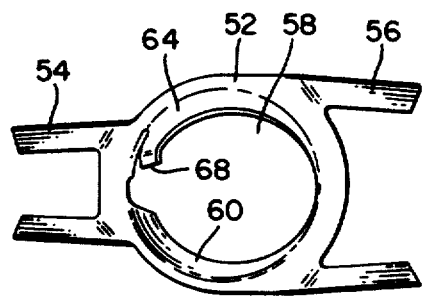
FIG. 6 is a front elevational view of the plate of the connector of FIG. 1.

Turning now to FIGS. 6, 7, and 8, the details of the plate 50 are set forth. Plate 50 is made of metal where the raceway 14 is made of metal and a conductive path between raceway 14 and the enclosure 18 is desired, but with plastic raceway or where no conductive path is desired plate 50 may be made of plastic. Plate 50 has a central portion 52 from which a first pair of arms 54 extend. The arms 54 are bent at their juncture with the central portion 52 to form an acute angle therewith (see FIG. 8). Spaced 180 degrees away along the central portion 52 and extending along a common axis with the pair of arms 54 are a further pair of arms 56. The spacing of the arms 56 are approximately equal to the diameter of the central portion 52 and greater than the spacing of the pair of arms 54. The arms 56 will take a position in the slot 46 of the ridge 38 while the arms 54 take a position in the restriction 48 and prevent the plate 50 from being passed through the body portion 22 during assembly at the factory. The arms 56 are similarly bent at their juncture with the central portion 52 to form an acute angle therewith. The resultant shape of the plate 50 is thus that of a dish (see FIG. 8) permitting some flexure of the arms 52, 54 to accommodate different wall 18 thicknesses while maintaining the wall 18 firmly gripped between the step 30 of tab 26 and the arms 52, 54.

An aperture 58 is placed in the central portion 52 of plate 50 and the metal thereabout is formed into one incomplete helical turn which engages the recess 72 between adjacent convolutions 70 as well as portions of the faces of the intermediate convolution 70 of the metallic raceway 14. The helical turn portion 60 is flared to a first side 62 of central portion 52 to provide a lead-in to the helical turn which continues into the helical turn portion 64 flared to the second side 66 of the central portion 52. At the end of portion 64, a tang 68 is formed and deformed inwardly into contact with the adjacent portion of the convolution 70 positioned between helical turn portions 60 and 64. The tang 68 will wipe the surface of the convolution 70 as the flexible metallic raceway 14 is advanced into the plate 50 but will bite into the surface of the convolution 70 to prevent unwanted retrogression of the flexible metallic raceway 14 from the plate 50 (see FIG. 9).

To install the connector 20 to a flexible metallic raceway 14, the following procedure is followed. The raceway 14 is cut to the desired length and if it contains conductors is cut to expose a sufficient length of the conductors 16 beyond the raceway 14 end. The extending conductors 16 are passed through aperture 27 and the connector 20 is then turned into the raceway 14 by gripping the body portion 22 at the flats 40, 42 so that the plate 50 passes over the raceway 14 surface with helical turn portions 60, 64 in the recesses 72 and tang 68 engaging the convolution 70 therebetween until the end of raceway 14 engages the shoulder 36. The assembly of the connector 20 to the flexible metallic raceway 14 is now complete. Now gripping the connector 20 by the flats 40, 42 or gripping the raceway and using it as a handle, the connector 20 first cylindrical portion 24 is inserted into the opening in wall 18 of the electrical enclosure until the arms 52, 54 are brought into contact with the exterior of the wall 18 and the interior of wall 18 engages step 30 of the tab 26, completing the installation. Where the raceway 14 contains no conductors 16, they can now be run through the terminated raceway 14.

The above described procedure is preferred where the opposite end of the flexible metallic raceway 14 is terminated or is so long it is not practical to attempt to turn it. However, where short lengths of unterminated flexible metallic raceway 14 are involved, the connector 20 may be inserted into the opening in wall 18 first and then the raceway 14 installed to the connector. Also, the use of only two tabs 26 has been shown, but it should be appreciated that two or more tabs may be employed if desired. In addition, more than one step 30 can be placed into each tab 26 to permit a wider range of wall 18 thicknesses to be accepted.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. A connector for mechanically and electrically joining a flexible metallic raceway to an electrical enclosure comprising: a body member having means to engage one surface of the wall of an electrical enclosure about an opening in such wall through which a portion of said body member is adapted to be passed; said body member having a longitudinal passage extending therethrough and a transverse passage communicating therewith; plate means having an aperture therethrough communicating with said longitudinal passage of said body member; said plate means positioned in said transverse passage of said body member; engagement means coupled to said plate means for engaging the second surface of the wall of an electrical enclosure about the opening in the wall through which a portion of said body member is adapted to be passed to thereby secure the connector to said electrical enclosure wall, whereby said wall will be between said means to engage and said engagement means; and coupling means on said connector for coupling a flexible metallic raceway to said connector.

2. A connector as defined in claim 1, wherein said coupling means is formed integrally with said plate means.

3. A connector as defined in claim 1, wherein said coupling means is formed integrally with said plate means about said aperture.

4. A connector as defined in claim 1, wherein said coupling means comprises at least a portion of one helical turn formed in said plate means about said aperture to threadingly engage at least a portion of the adjacent surfaces of a convolution of a raceway advanced into said connector and the recesses adjacent to such convolution.

5. A connector as defined in claim 1, wherein said coupling means comprises at least a portion of one helical turn formed in said plate means about said aperture to threadingly engage at least a portion of the adjacent surfaces of a convolution of a raceway advanced into said connector and the recesses adjacent to such convolution and a detent tang formed at the trailing end of said helical turn and turned inwardly toward the surface of a raceway convolution to securely grip such surface to prevent the undesired retrograde of such raceway from said connector.

6. A connector as defined in claim 5, wherein said plate means is made of resilient material and said engagement means comprises two pairs of fingers formed integrally with said plate means, each pair of fingers extending in opposite directions along a common axis, said fingers being inwardly directed towards said means to engage said one surface and flexible to accommodate a range of electrical enclosure wall thicknesses between said fingers and said means to engage said one surface.

7. A connector as defined in claim 6, further comprising a front face sealing the portion of said body member adapted to be passed through said opening in the wall of an electrical enclosure and an aperture in said front face having a diameter less than the width of said longitudinal passage and communicating therewith, said front face preventing the passage of a flexible metallic raceway through said connector while said aperture provides a protected entrance into said electrical enclosure for conductors placed in said raceway.

8. A connector as defined in claim 1, wherein said engagement means comprise fingers formed integrally with said plate means.

9. A connector as defined in claim 1, wherein said engagement means comprises at least two pairs of fingers formed integrally with said plate means.

10. A connector as defined in claim 1, wherein said engagement means comprises two pairs of fingers formed integrally with said plate means, each pair of fingers extending in opposite directions along a common axis.

11. A connector as defined in claim 1, wherein said plate means is made of resilient materials and said engagement means comprises two pairs of fingers formed integrally with said plate means, each pair of fingers extending in opposite directions along a common axis, said fingers being inwardly directed towards said wall of the electrical enclosure and flexible to accommodate a range of electrical enclosure wall thicknesses between said fingers and said means to engage said body member.

12. A connector as defined in claim 1, wherein said means to engage comprises at least two resilient tabs extending outwardly from said body member.

13. A connector as defined in claim 1, further comprising a front face sealing the portion of said body member adapted to be passed through said opening in the wall of an electrical enclosure and an aperture in said front face having a diameter less than the width of said longitudinal passage and communicating therewith, said front face preventing the passage of a flexible metallic raceway through said connector while said aperture provides a protected entrance into said electrical enclosure for conductors placed in said raceway.

14. A connector as defined in claim 1, further comprising an annular ring about said body member adjacent said transverse passage to be engaged by and support said plate means.

15. A connector as defined in claim 1, further comprising an annular ring about said body member adjacent said transverse passage to be engaged by and support said plate means and flat portions on the periphery of said annular ring to facilitate the grasping of said connector as said body member is inserted into a knockout in an electrical enclosure wall.

16. A connector as defined in claim 1, wherein said body member is constructed of an insulating material.

17. A connector as defined in claim 1, wherein said plate means is constructed of a conductive material.

18. A connector as defined in claim 1, wherein said plate means is constructed of a conductive material to provide a complete electrical path between a flexible metallic raceway and the wall of an electrical enclosure.

19. A connector as defined in claim 1, wherein said body member is constructed of an insulating material and said plate means is constructed of a conductive material.

* * * * *